(12) United States Patent
Suzuki et al.

(10) Patent No.: US 9,262,672 B2
(45) Date of Patent: Feb. 16, 2016

(54) PATTERN RECOGNITION APPARATUS AND PATTERN RECOGNITION METHOD THAT REDUCE EFFECTS ON RECOGNITION ACCURACY, AND STORAGE MEDIUM

(75) Inventors: Takashi Suzuki, Kawasaki (JP); Yoshinori Ito, Tokyo (JP); Katsuhiko Mori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/071,869

(22) Filed: Mar. 25, 2011

(65) Prior Publication Data

US 2011/0243398 A1    Oct. 6, 2011

(30) Foreign Application Priority Data

Mar. 30, 2010    (JP) .................................. 2010-078984

(51) Int. Cl.
*G06K 9/00* (2006.01)
*G06K 9/62* (2006.01)

(52) U.S. Cl.
CPC .......... *G06K 9/00288* (2013.01); *G06K 9/6202* (2013.01); *G06K 9/6255* (2013.01)

(58) Field of Classification Search
None
See application file for complete search history.

(56) References Cited

U.S. PATENT DOCUMENTS

| 6,611,613 | B1 * | 8/2003 | Kang et al. | 382/118 |
| 7,532,745 | B2 | 5/2009 | Inoue | |
| 8,929,595 | B2 * | 1/2015 | Suzuki | G06K 9/00281 382/103 |
| 9,092,662 | B2 * | 7/2015 | Suzuki | G06K 9/00281 |
| 2002/0181775 | A1 * | 12/2002 | Matsugu | 382/195 |
| 2006/0228005 | A1 * | 10/2006 | Matsugu et al. | 382/116 |
| 2007/0177807 | A1 * | 8/2007 | Enomoto | 382/224 |
| 2009/0190834 | A1 * | 7/2009 | Inoue | G06K 9/00221 382/181 |
| 2011/0158540 | A1 * | 6/2011 | Suzuki | G06K 9/00281 382/195 |
| 2011/0243398 | A1 * | 10/2011 | Suzuki | G06K 9/00288 382/118 |
| 2012/0288148 | A1 * | 11/2012 | Suzuki | G06K 9/00281 382/103 |

FOREIGN PATENT DOCUMENTS

JP    2003-323622 A    11/2003
JP    2005-149074 A    6/2005

OTHER PUBLICATIONS

Japanese Office Action cited in Japanese counterpart application No. JP2010-078984, dated Nov. 26, 2013.

* cited by examiner

*Primary Examiner* — Aaron W Carter
(74) *Attorney, Agent, or Firm* — Rossi, Kimms & McDowell LLP

(57) ABSTRACT

A pattern recognition apparatus that is lightweight for mounting, and reduces the effects of registration conditions or check conditions on recognition accuracy. Similarity sets for respective local features are calculated from a local feature of input data and local features of a plurality of pieces of dictionary data corresponding to the local feature of the input data. Integrated similarities are calculated by integrating a plurality of similarity sets in the local features according to a registration condition or a check condition. Dictionary data corresponding to the input data is identified based on the calculated integrated similarities.

8 Claims, 11 Drawing Sheets

| NUMBER-OF-REGISTERED-IMAGES CONDITION | NUMBER OF SIMILARITIES TO BE INTEGRATED |
|---|---|---|
| NUMBER OF REGISTERED IMAGES: LARGE | TEN | TOP 70 |
| ⋮ | $M_p$ | TOP $N_{M_p}$ |
| ⋮ | ⋮ | ⋮ |
| NUMBER OF REGISTERED IMAGES: SMALL | ONE | TOP 50 |

701 PARAMETER TABLE

| NUMBER-OF-REGISTERED-IMAGES CONDITION | | NUMBER OF SIMILARITIES TO BE INTEGRATED |
|---|---|---|
| NUMBER OF REGISTERED IMAGES: LARGE | TEN | TOP 70 |
| ⋮ | $M_p$ | TOP $N_{Mp}$ |
| NUMBER OF REGISTERED IMAGES: SMALL | ONE | TOP 50 |

701 PARAMETER TABLE

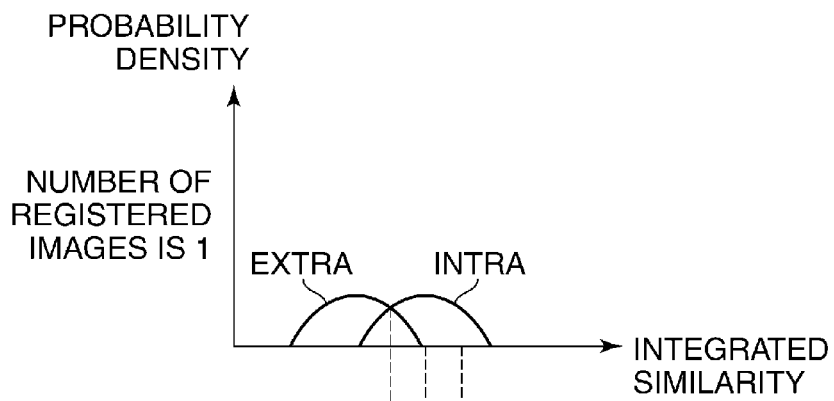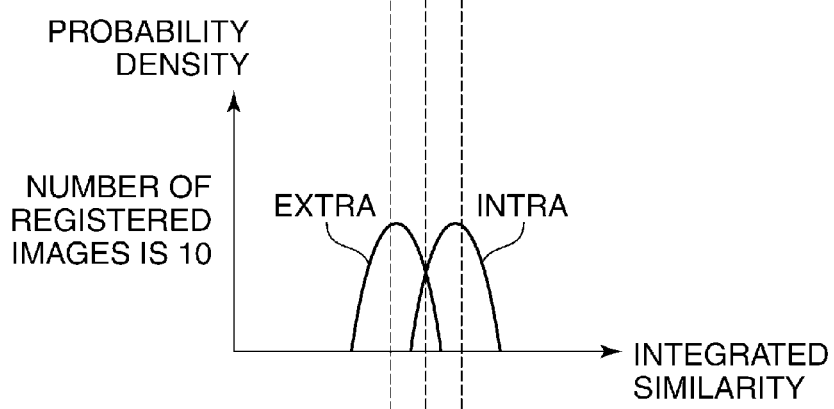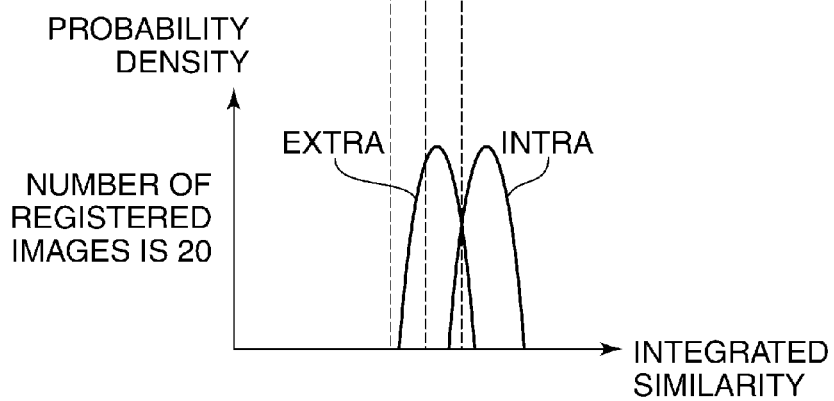

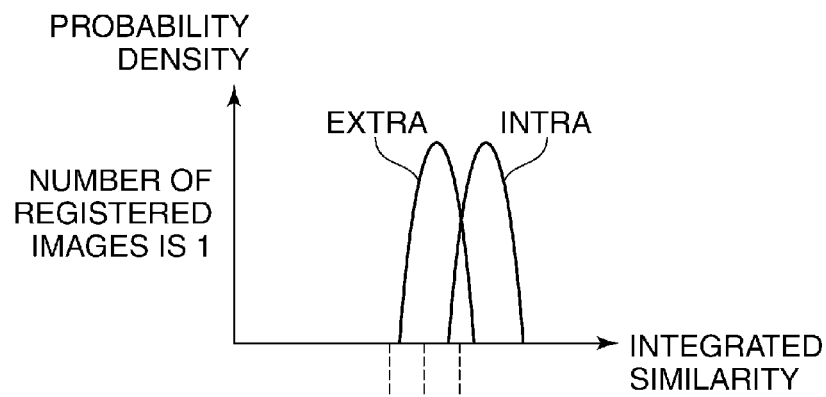
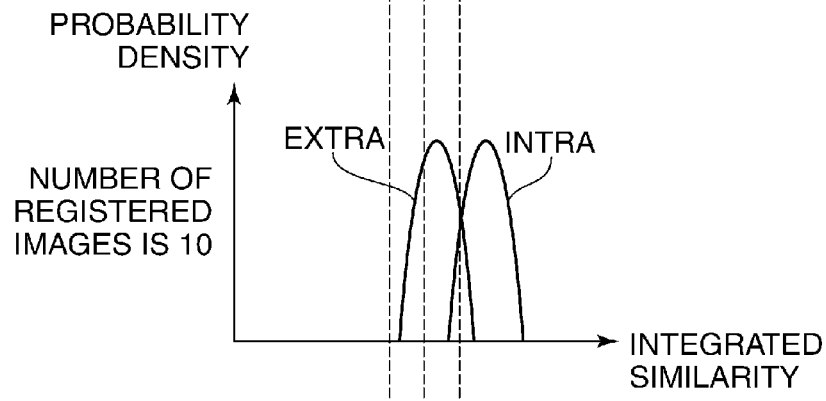
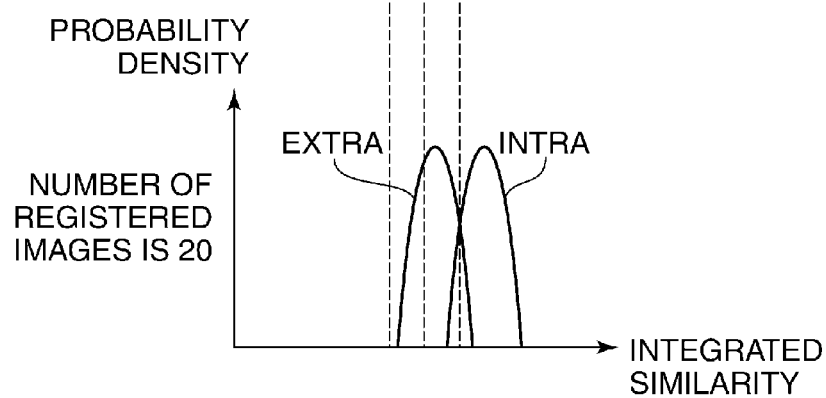
1001 INTEGRATED SIMILARITY DISTRIBUTION AFTER RESEARCH

FIG.13

| | HEAD POSE IN DICTIONARY DATA | | | | |
|---|---|---|---|---|---|
| | FRONT | LEFT 30° | RIGHT 30° | UP 30° | DOWN 30° |
| HEAD POSE IN INPUT DATA FRONT | $N_{MP}=70$ | $N_{MP}=60$ | $N_{MP}=60$ | $N_{MP}=60$ | $N_{MP}=60$ |
| LEFT 30° | $N_{MP}=60$ | $N_{MP}=70$ | $N_{MP}=50$ | $N_{MP}=50$ | $N_{MP}=50$ |
| RIGHT 30° | $N_{MP}=60$ | $N_{MP}=50$ | $N_{MP}=70$ | $N_{MP}=50$ | $N_{MP}=50$ |
| UP 30° | $N_{MP}=60$ | $N_{MP}=50$ | $N_{MP}=50$ | $N_{MP}=70$ | $N_{MP}=50$ |
| DOWN 30° | $N_{MP}=60$ | $N_{MP}=50$ | $N_{MP}=50$ | $N_{MP}=50$ | $N_{MP}=70$ |

1301 HEAD POSE PARAMETER TABLE

PATTERN RECOGNITION APPARATUS AND PATTERN RECOGNITION METHOD THAT REDUCE EFFECTS ON RECOGNITION ACCURACY, AND STORAGE MEDIUM

BACKGROUND OF THE INVENTION

1. Field of the Invention

The present invention relates to a pattern recognition apparatus, a pattern recognition method, and a computer-readable storage medium storing a program for causing a computer to implementing the method.

2. Description of the Related Art

There are pattern recognition techniques that detect and identify a predetermined pattern from an input pattern. With improvements in computer performance, pattern recognition techniques have also enhanced, and recently, systems that detect a face in an image in real time have emerged. Also, there are known face recognition techniques that detect a face region in an image and check who is a person in the face region.

The accuracy of the face recognition techniques depends a great deal on registration conditions of registration data. Examples of the registration conditions include lighting environment, variations in head pose, changes in facial expression, effects of occlusion, characteristics of an image pickup device, the number of registered images for each registered person, and the number of registered persons.

Several techniques have been proposed to deal with variations in these registration conditions. A description will now be given of the reason why variations in the number of registered images affect, which are exemplary variations, face recognition accuracy, and a technique that has been proposed.

First, a description will be given of the effects which the number of registered images has on face recognition accuracy. When a person other than registered persons is to be checked, it is highly probable that an image similar to the person exists in registered images for a registered person for which there are a number of registered images. In this case, the similarity between the registered person for which there are a large number of registered images and the other person is high on average. Such variations in similarity affect a false acceptance rate indicative of the probability at which another person is falsely identified as a registered person. A technique to reduce this effect is disclosed in Japanese Laid-Open Patent Publication (Kokai) No. 2005-149074.

According to Japanese Laid-Open Patent Publication (Kokai) No. 2005-149074, a checking algorithm or a feature amount is dynamically changed according to the number of registered images so as to enhance robustness against variations in the number of registered images. To dynamically change the checking algorithm, distances between a distribution obtained from a plurality of personal images and an input image are recognized based on similarity. On the other hand, when the number of registered images is small, recognition is performed based on a similarity between one personal image and an input image. It is described in Japanese Laid-Open Patent Publication (Kokai) No. 2005-149074 that the greater the number of registered images, the more accurate the expression of a personal distribution, and thus, in this case, by performing a statistic checking method, recognition accuracy can be enhanced. Moreover, it is described that regarding the way in which a feature amount is changed, when the number of registered images is small, luminance data on each image is used as a feature amount. On the other hand, it is described that when the number of registered images is large, a mean vector after projection, which has been projected to a predetermined eigenspace, is used as a feature amount.

According to Japanese Laid-Open Patent Publication (Kokai) No. 2005-149074, a checking algorithm or a feature amount is changed according to the number of registered images for a registered person, but this is not preferable in terms of resources because a plurality of checking means and feature amount extracting means have to be prepared for mounting.

SUMMARY OF THE INVENTION

The present invention provides a pattern recognition apparatus that is lightweight for mounting, and reduces the effects of registration conditions or check conditions on recognition accuracy, a pattern recognition method, and a computer-readable storage medium storing a program for causing a computer to implementing the method.

Accordingly, a first aspect of the present invention provides a pattern recognition apparatus comprising a similarity set calculation unit configured to calculate similarity sets for respective local features from a local feature of input data and local features of a plurality of pieces of dictionary data corresponding to the local feature of the input data, an integrated similarity calculation unit configured to calculate integrated similarities by integrating a plurality of similarity sets in the local features calculated by the similarity set calculation unit according to a registration condition or a check condition, and an identification unit configured to identify dictionary data corresponding to the input data based on the integrated similarities calculated by the integrated similarity calculation unit.

Accordingly, a second aspect of the present invention provides a pattern recognition method implemented by a pattern recognition apparatus, comprising a similarity set calculation step of calculating similarity sets for respective local features from a local feature of input data and local features of a plurality of pieces of dictionary data corresponding to the local feature of the input data, an integrated similarity calculation step of calculating integrated similarities by integrating a plurality of similarity sets in the local features calculated in the similarity set calculation step according to a registration condition or a check condition, and an identification step of identifying dictionary data corresponding to the input data based on the integrated similarities calculated in the integrated similarity calculation step.

Accordingly, a third aspect of the present invention provides a non-transitory storage medium storing a computer-readable program for causing a pattern recognition apparatus to implement a pattern recognition method, the method comprising a similarity set calculation step of calculating similarity sets in local features from a local feature of input data and local features of a plurality of pieces of dictionary data corresponding to the local features of the input data, an integrated similarity calculation step of calculating integrated similarities by integrating a plurality of similarity sets in the local features calculated in the similarity set calculation step according to a registration condition or a check condition, and an identification step of identifying dictionary data corresponding to the input data based on the integrated similarities calculated in the integrated similarity calculation step.

According to the present invention, light weight for mounting can be realized, and the effects of registration conditions or check conditions on recognition accuracy can be reduced.

Further features of the present invention will become apparent from the following description of exemplary embodiments (with reference to the attached drawings).

BRIEF DESCRIPTION OF THE DRAWINGS

FIGS. 9A to 9C are diagrams showing changes in integrated similarity when the number of registered images changes.

FIGS. 10A to 10C are diagrams showing exemplary distributions of integrated similarity after the number of similarities to be integrated is adjusted.

FIG. 13 is a diagram showing an exemplary parameter table according to a fourth embodiment.

DESCRIPTION OF THE EMBODIMENTS

The present invention will now be described with reference to the drawings showing embodiments thereof.

Face recognition based on image information is a specific embodiment, which will now be described in detail. It should be noted that processing in the present embodiment is not limited to face recognition, but may be, for example, vein recognition or fingerprint recognition. Processing in the present embodiment may also be object recognition for cars and pets as well as faces and persons.

In the present embodiment, parameter adjustment is carried out so as to prevent accuracy degradation due to registration conditions and/or check conditions, to be described later. A description will be given below of a case where only a difference in the number of registered images determined only by a registration condition is used as a condition.

Figure 1:
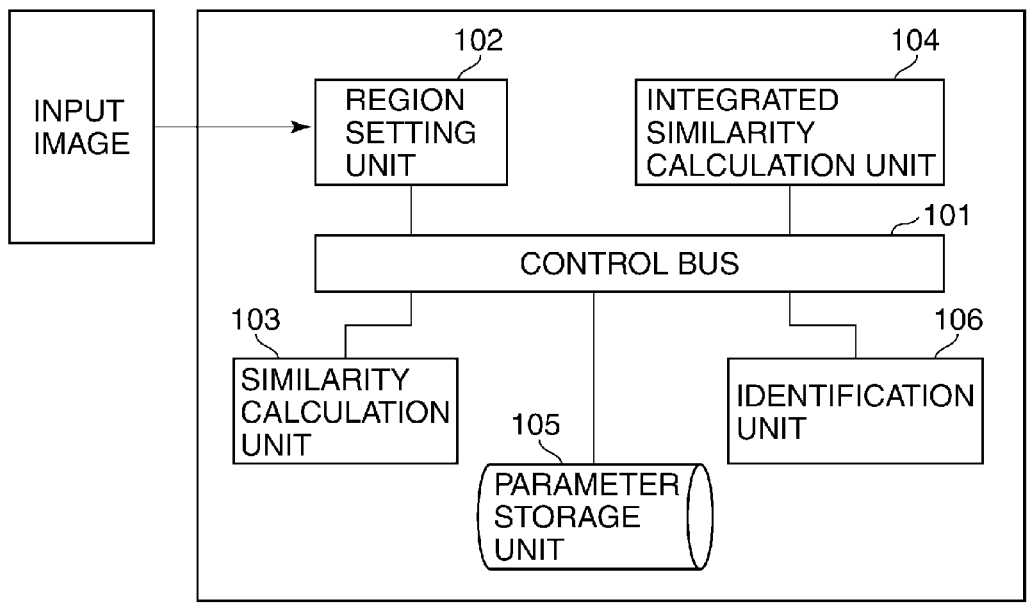
FIG. 1 is a diagram schematically showing an exemplary arrangement of a pattern recognition apparatus.

FIG. 1 is a diagram schematically showing an exemplary arrangement of a pattern recognition apparatus. The pattern recognition apparatus in FIG. 1 is comprised of a region setting unit 102, a similarity calculation unit 103, an integrated similarity calculation unit 104, a parameter storage unit 105, and an identification unit 106, which are connected together via a control bus 101. Then, detailed description will be given of each block. The control bus 101 controls input or output to and from each functional block. The region setting unit 102 obtains input data input from outside, that is, an input image using a predetermined means, and sets, for the obtained image, local regions from which feature amounts are extracted. A detailed description will be given later of how the local regions are set, and others. The image is obtained in a common way; for example, the image is obtained via an image pickup device such as a CCD which is incorporated in the pattern recognition apparatus. Examples of the image include a face image and a human image. The similarity calculation unit 103 calculates similarities between the input image and a dictionary image, which is obtained in advance, in respective local regions set by the region setting unit 102. A detailed description will be given later of how the similarities are calculated. It should be noted that the above dictionary image is stored in a predetermined storage unit, not shown. The integrated similarity calculation unit 104 calculates an integrated similarity by integrating a plurality of similarities in logical regions obtained by the similarity calculation unit 103. A detailed description will be given later of how the integrated similarity is calculated. The parameter storage unit 105 is a storage device that stores parameters to be used by the integrated similarity calculation unit 104. The parameter storage unit 105 is comprised of an HDD or a semiconductor storage device. A detailed description will be given later of the parameters. The identification unit 106 carries out a process to identify which dictionary image corresponds to the input image using the integrated similarity. A detailed description will be given later of the identification process. It should be noted that the region setting unit 102, the similarity calculation unit 103, the integrated similarity calculation unit 104, and the identification unit 106 are each comprised of an arithmetic circuit or firmware.

However, the region setting unit 102, the similarity calculation unit 103, the integrated similarity calculation unit 104, and the identification unit 106 may be configured as software. Namely, the region setting unit 102, the similarity calculation unit 103, the integrated similarity calculation unit 104, and the identification unit 106 may be implemented by a CPU carrying out processes based on programs stored in a storage device or the like.

Figure 2:
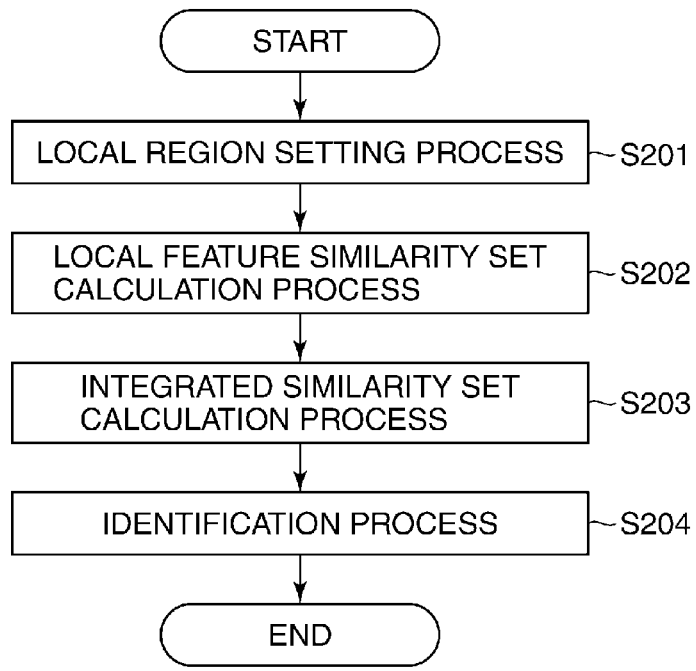
FIG. 2 is a flowchart showing an exemplary pattern recognition process.

FIG. 2 is a flowchart showing an exemplary pattern recognition process. A detailed description will now be given of the present embodiment with reference to FIG. 2.

In step S201, the region setting unit 102 sets local regions. More specifically, for an input image (a check image), the region setting unit 102 determines positions of local regions from which local features targeted for similarity calculation are to be extracted. The positions of local regions can be determined in a common way, and in the present embodiment, the positions of local regions are determined as described below.

The region setting unit 102 detects a face from the input image using a common object detection method, more specifically, a face detection method, and sets local regions using an origin coordinate of a segmented normalized image as a reference point based on the detection result.

Figure 3:
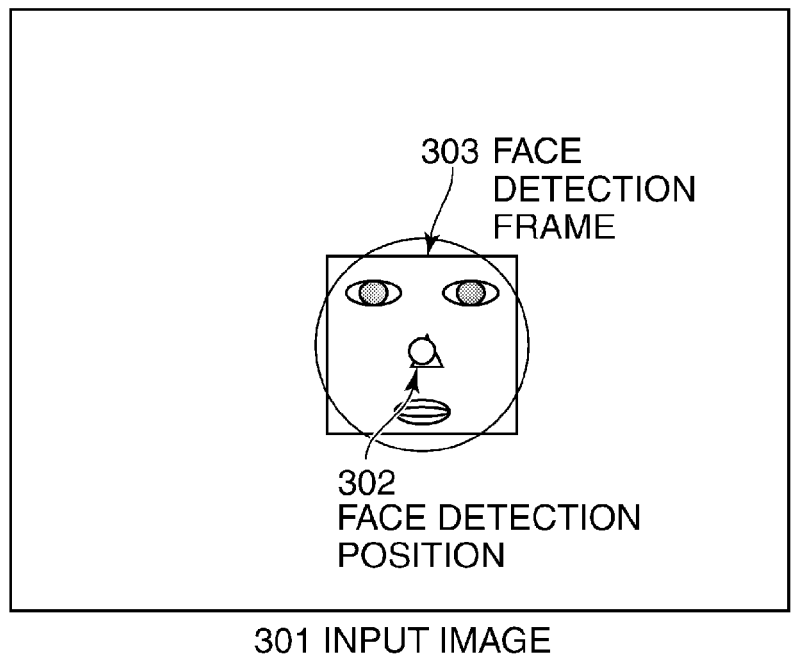
FIG. 3 is a diagram showing an exemplary face detection frame.

The segmented normalized image can be created in a common way. In the present embodiment, as shown in FIG. 3, the region setting unit 102 performs a segment based on a face detecting position 302 output during face detection, and enlargement or reduction of the image based on the height and width of a face detection frame 303 so that the width of the face detection frame 303 can be an arbitrary value. It should be noted that a well-known template matching method can be used for face detection. Moreover, the region setting unit 102 can determine the height and width of the face detection frame 303 using eye feature point detection results. More specifically, the region setting unit 102 determines the height and width of the face detection frame 303 so that they can be twice the distance between both eyes determined by coordinates of detected eye feature points. It should be noted that positions of organs such as eye feature points can be detected by, for example, extracting an area which is likely to be the left eye using a template of local features corresponding to an area around the left eye.

Figure 4:
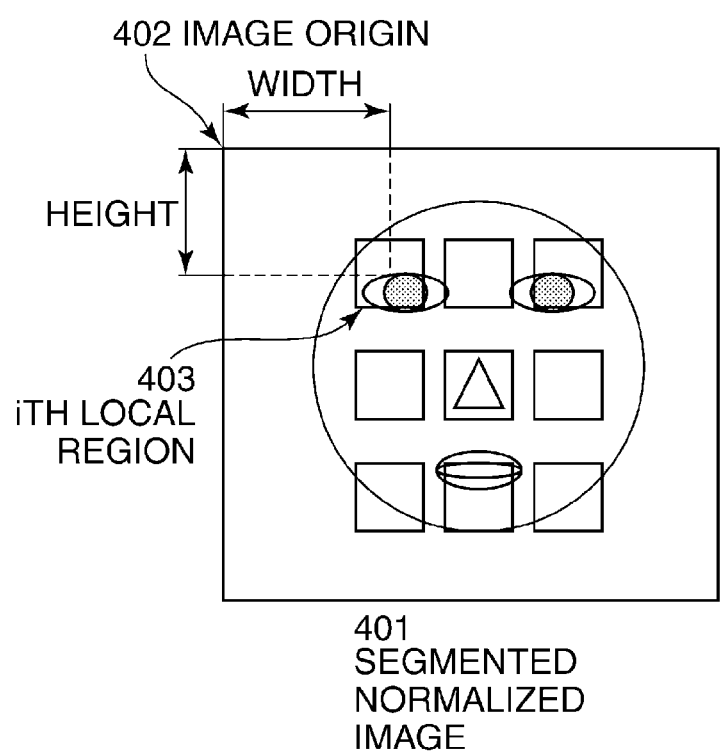
FIG. 4 is a diagram showing an exemplary segmented normalized image.

FIG. 4 is a diagram showing an exemplary segmented normalized image. A face region of a segmented normalized image 401 exists at substantially the same position with respect to every face image as long as face sizes output during face detection are accurate. Local regions are determined using an image origin point 402 of the segmented normalized image 401 as a reference point. Namely, the ith local region 403 is positioned Width pixels and Height pixels away from the image origin point 402 in horizontal and vertical directions, respectively, of the segmented normalized image 401. This is illustrated in FIG. 4. Similarly, local regions other than the ith local region 403 are controlled by information indicative of how many pixels there are from the image origin point (or the ith local region). This is a general outline of the process in the step S201 in FIG. 2.

Referring again to FIG. 2, in the next step S202, the similarity calculation unit 103 calculates a local feature similarity set. More specifically, the similarity calculation unit 103 calculates similarity between a local feature extracted from the ith local region in FIG. 4 set in the step S201 and a local feature extracted from the corresponding ith local region of one dictionary image. Here, the similarity calculation unit 103 calculates similarity with respect to each local feature according to the following formula:

[Formula 1]

$$S_{ki}^p = \frac{(I_i \cdot I_{ki}^p)}{|I_i||I_{ki}^p|} \quad (1)$$

Here, in the formula (1), $$S_{ki}^p \quad \text{[Formula 2]}$$

is a similarity between the ith local region of the input image and the ith local region of a dictionary image described above of the kth dictionary image for a registered person p. Moreover, $$I_i \quad \text{[Formula 3]}$$

is a local feature, which is a luminance value of the ith local region of the input image. Moreover, $$I_{ki}^p \quad \text{[Formula 4]}$$

is also a local feature, which is a luminance value of the ith local region of the kth dictionary image for a registered person p. According to the formula (1), similarity is calculated based on luminance values, but this is not limitative. Namely, the similarity calculation unit 103 may calculate similarity based on output results of predetermined filter calculations. Moreover, the similarity calculation unit 103 may obtain similarity in other ways other than the formula (1). For example, the similarity calculation unit 103 may obtain similarity based on the Euclidean distance between $$I_i \quad \text{[Formula 5]}$$

and $$I_{ki}^p \quad \text{[Formula 6]}$$

Figure 5:
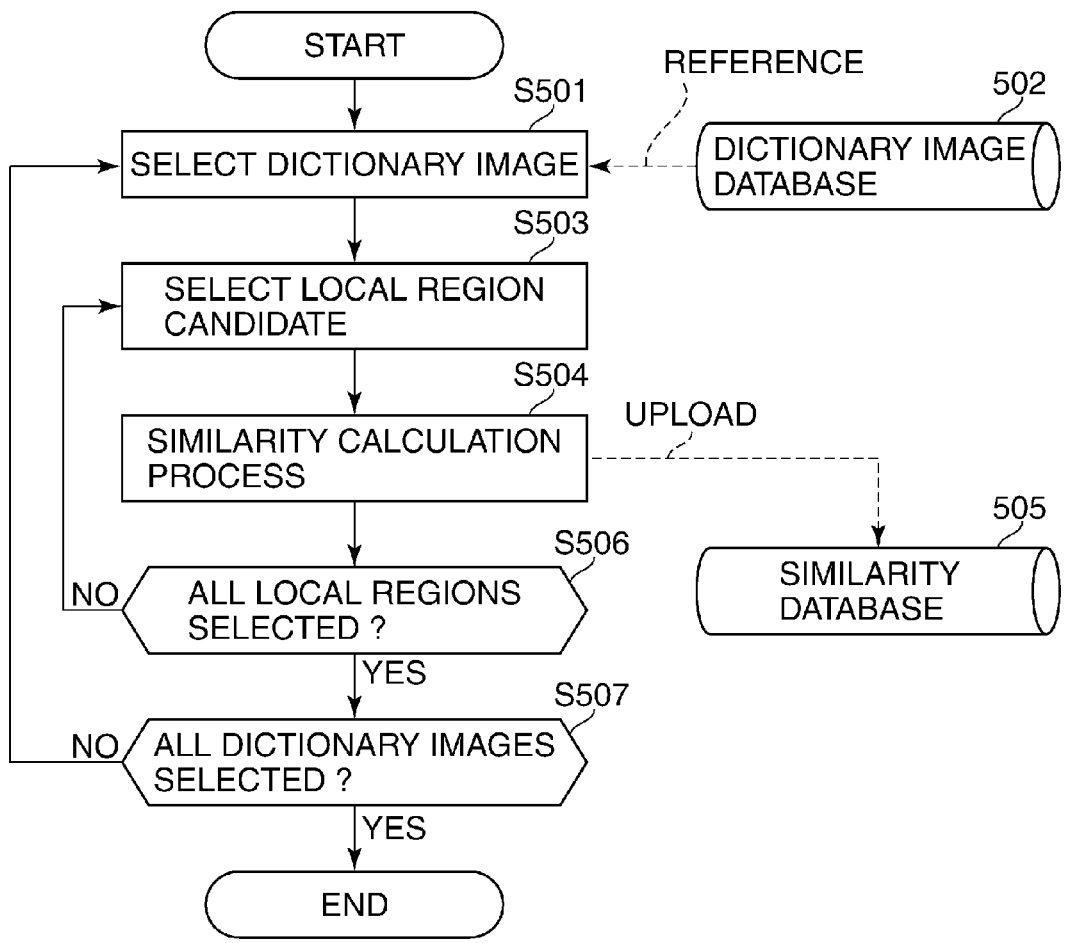
FIG. 5 is a flowchart showing an exemplary local feature similarity set calculation process.

In the step S202, the similarity calculation unit 103 calculates similarities expressed by the formula (1) with respect to all registered images, and calculates a local feature similarity set. A detailed description will now be given of a local feature similarity set calculation process with reference to a process flowchart of FIG. 5.

In step S501, the similarity calculation unit 103 selects the kth image for the registered person p from a dictionary image database 502, to be described later.

Figure 6:
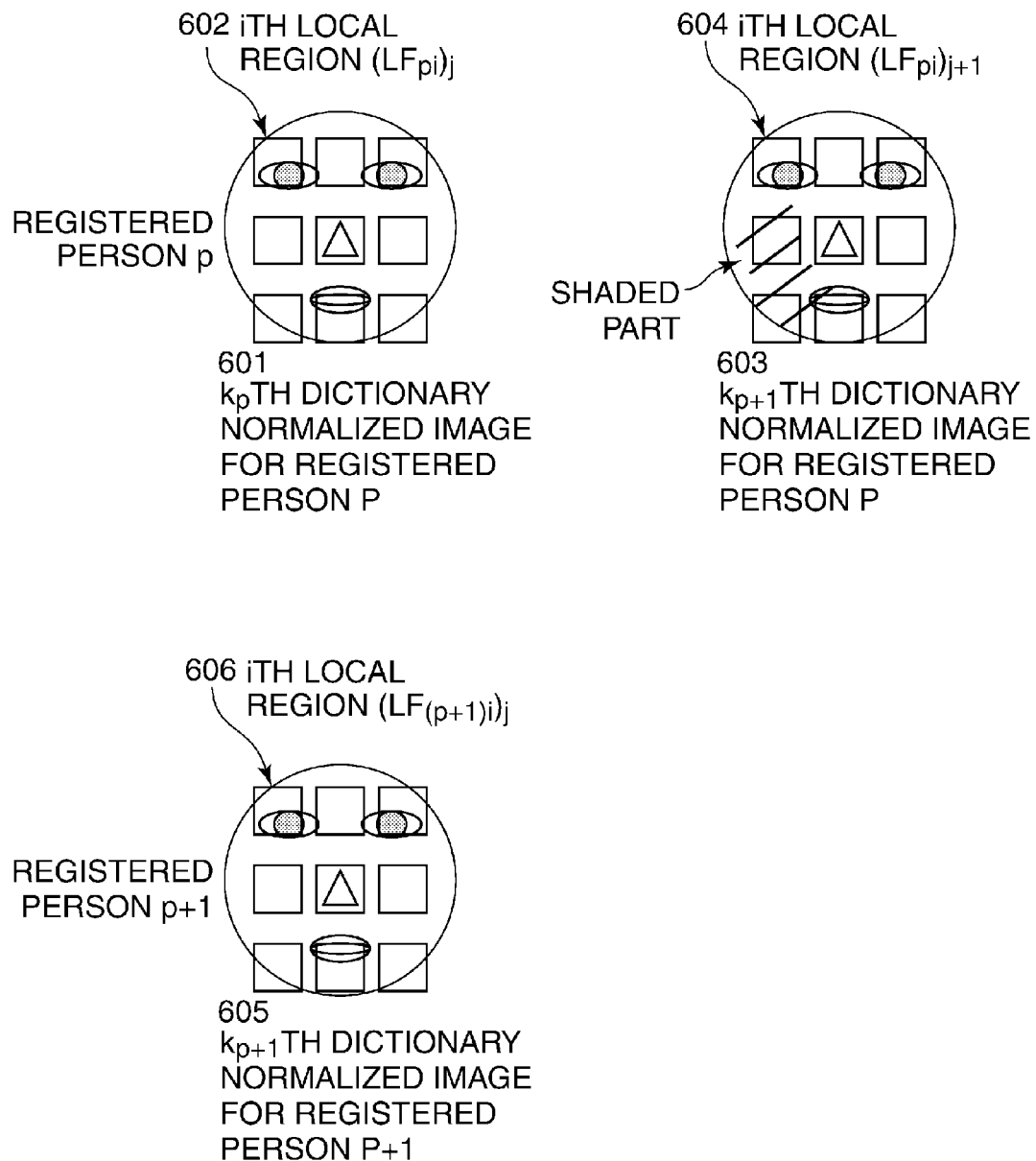
FIG. 6 is a diagram showing an exemplary dictionary database.

Next, a detailed description will be given of the dictionary image database 502. As shown in FIG. 6, a plurality of images for a plurality of registered persons obtained at different times are recorded in the dictionary image database 502. Moreover, additional information such as IDs that identify registered persons, the number of registered persons, and the number of registered images is also recorded as dictionary information in the dictionary image database 502. First, for the registered person p, a $k_p$th dictionary normalized image 601 and a $k_p^{+1}$th dictionary normalized image 603 are recorded. It is a matter of course that dictionary images for the registered person p are not limited to the two as shown in FIG. 6, but any number of dictionary images may be recorded. It should be noted that a dictionary normalized image means an image of a given registered person normalized in a predetermined size like the segmented normalized image shown in FIG. 4. Moreover, the dictionary normalized image 601 and the dictionary normalized image 603 are not exactly the same, but the dictionary normalized image 603 is different from the dictionary normalized image 601, for example, the dictionary normalized image 603 is shaded as shown in the figure. Similarly, for a registered person p+1, a $k_{p+1}$th dictionary normalized image 605 is recorded in the dictionary image database 502. With regard to the registered person p+1 as well, the number of dictionary normalized images is not limited to one, but may be plural. The dictionary image database 502 may not store images, but may record feature amounts of given local regions in respective dictionary normalized images. In this case, it is absolutely necessary to, in the database, associate the ith local region of the $k_p$th dictionary normalized image for the registered person p with its feature amount typified by a luminance value. In step S501, the similarity calculation unit 103 selects a target dictionary normalized image from the dictionary image database 502 in which data is recorded as shown in FIG. 6.

Next, in step S503, the similarity calculation unit 103 refers to the ith local region of the dictionary normalized image selected in the step S501. A method for referring to the local region is the same as the region setting method in the step S201, and therefore, description thereof is omitted.

Next, in step S504, the similarity calculation unit 103 calculates similarity from a local feature in the ith local region referred to in the step S503 and a local feature in the corresponding ith local region of the input image. The similarity calculation unit 103 calculates similarity using the formula (1). The similarity calculation unit 103 sequentially records calculated similarities in a similarity database 505. In the present embodiment, a similarity set connected to dictionary information is recorded in the similarity database 505. Here, the dictionary information means IDs and registered images as described above.

Next, in step S506, the similarity calculation unit 103 checks whether or not all local regions set in the dictionary image selected in the step S501 have been referred to. When all local regions have not been referred to, the similarity calculation unit 103 proceeds to the step 503 again, and when all local regions have been referred to, the similarity calculation unit 103 proceeds to step 507.

Then, in the step S507, the similarity calculation unit 103 determines whether or not processing in all dictionary images recorded in the dictionary image database 502 described above has been completed. When processing in all dictionary images has been completed, the similarity calculation unit 103 terminates the process in the flowchart of FIG. 5.

Referring again to FIG. 2, in step S203, the integrated similarity calculation unit 104 calculates an integrated similarity. The integrated similarity is a value obtained by combining similarities of local features in local regions into one with respect to each registered image. In the present embodiment, the integrated similarity is a weighted average value.

The integrated similarity calculation unit 104 obtains the integrated similarity according to the following formula:

[Formula 7]

$$\text{Integrated similarity}(IS_{k_p}) = \frac{\sum_i w_i S_{k_p i}^p}{\sum_i w_i} \quad \text{where } w_i = 0 \text{ or } 1 \quad (2)$$

Here, $$IS_{k_p} \quad \text{[Formula 8]}$$

represents an integrated similarity with respect to the $k_p$th dictionary normalized image 601. It should be noted that the integrated similarity is calculated for each dictionary image.

$$S_{k_p i}^p \quad \text{[Formula 9]}$$

is a similarity with respect to each local region, and more specifically, represents a similarity between local features of the ith local region of the $k_p$th dictionary normalized image for the registered person p and the corresponding ith local region of the input image. $W_i$ is a weight for use in calculating a weighted average, and only 0 and 1 are output as values thereof. For example, the integrated similarity calculation unit 104 calculates an integrated similarity using top 70 local feature similarities among 100 local feature similarities. A detailed description will now be given of the weight.

First, the integrated similarity calculation unit 104 dynamically determines weights by sorting local feature similarities according to predetermined parameters. More specifically, the integrated similarity calculation unit 104 sorts local feature similarities $$S_{k_p i}^p \quad \text{[Formula 10]}$$

with respect to region numbers i, and assigns a weight of 1 to a predetermined number of higher ranked local features. On the other hand, the integrated similarity calculation unit 104 assigns a weight of 0 to local feature similarities not included in the predetermined number of higher ranked local features. Namely, an integrated similarity means a similarity on an image-by-image basis with those having small similarities omitted. Thus, the predetermined parameters determine how many higher ranked local feature similarities are used, that is, the number of local feature similarities to be integrated. A description will now be given of the parameters.

Figures 7, 8:
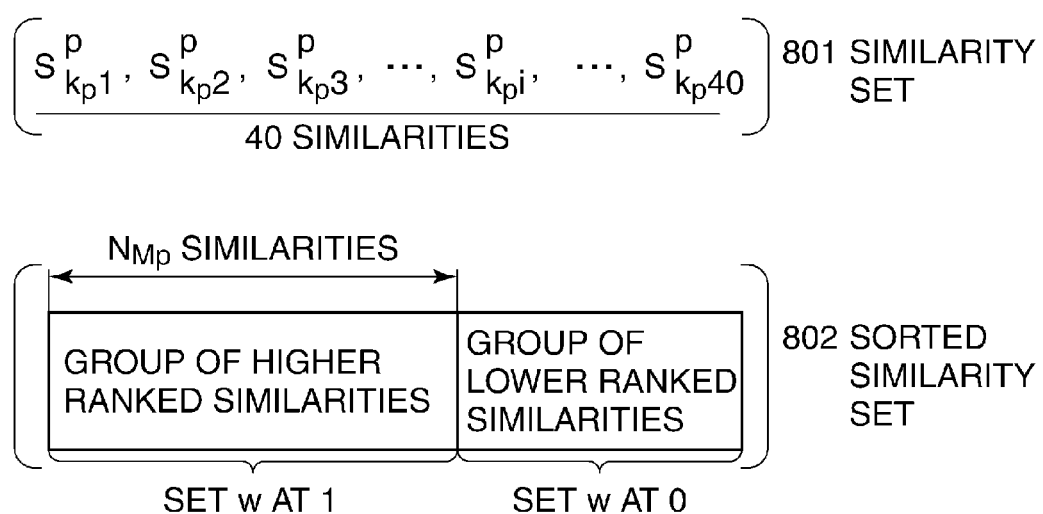
FIG. 7 is a diagram showing an exemplary parameter table according to a first embodiment.
FIG. 8 is a conceptual diagram showing how integrated similarly is calculated from unintegrated similarities using the parameter table in FIG. 7.

The parameters are given as shown in a table of FIG. 7. A parameter table 701 in FIG. 7 shows in detail the parameters, and shows how many higher ranked similarities are used for the formula (2). In the parameter table 701, the number of local feature similarities to be integrated is determined with respect to each number of registered images for each registered person p. The parameter table 701 shows that, for example, when there are 10 registered images for a predetermined registered person, an integrated similarity is calculated from top 70 local feature similarities. On the other hand, the parameter table 701 shows that when there is only one registered image for a predetermined registered person, an integrated similarity is calculated from top 50 local feature similarities. Namely, the number of local feature similarities to be integrated is controlled by the parameters. Next, a description will be given of how to use the parameter table 701 in FIG. 7.

FIG. 8 is a conceptual diagram showing how an integrated similarly is calculated from unintegrated similarities using the parameter table of FIG. 7. A similarity set 801 in FIG. 8 represents a similarity set before integration. The similarity set 801 is a similarity set obtained from the $k_p$th dictionary image and the input image.

$$S_{k_p i}^p \quad \text{[Formula 11]}$$

represents a local feature similarity in the ith local region. It is assumed here that there are 100 local feature similarities. Namely, the number of local regions is 100. A similarity set after sorting in descending order is represented by a post-sorting similarity set 802. As shown in the similarity set 802 in FIG. 8, the integrated similarity calculation unit 104 divides the similarity set into two groups after sorting. The two groups consist of a higher-ranked similarity group and a lower-ranked similarity group. The higher-ranked similarity group is comprised of $N_{MP}$ higher-ranked similarities. Here, $N_{MP}$ is the number of local feature similarities to be integrated determined by the number of registered images Mp for the registered person p in the parameter table 701 shown in FIG. 7. It should be noted that $N_{MP}$ is 100 or less. Further, the integrated similarity calculation unit 104 sets the weight $W_i$ (see the formula (2)) at 1 for similarities included in the higher-ranked similarity group. On the other hand, the integrated similarity calculation unit 104 sets the weight $W_i$ at 0 for similarities included in the lower-ranked similarity group. Using the weights determined as described above, the integrated similarity calculation unit 104 calculates integrated similarities according to the formula (2). Next, a description will be given of the reason why the number of local feature similarities to be integrated is changed according to the number of registered images as shown in the parameter table of FIG. 7.

FIGS. 9A to 9C are diagrams showing changes in integrated similarity when the number of registered images changes. The horizontal axis represents integrated similarity, and the vertical axis represents probability density. Moreover, it is assumed that in FIGS. 9A to 9C, the number of regions to be integrated is the same. Namely, integrated similarity here means integrated similarity in a case where the number of similarities to be integrated is the same for every number of registered images. Moreover, integrated similarity in a case where matching two images show the same person is included in a distribution designated by "intra" in FIGS. 9A to 9C. On the other hand, integrated similarity in a case where two images for matching show different persons is included in a distribution designated by "extra" in FIGS. 9A to 9C. As shown in FIGS. 9A to 9C, when the number of registered images increases, distributions of intra (similarity between the same person) and extra (similarity between different persons) make their transitions. Namely, when the number of registered images increases, a check image has a high probability of being similar to and similar to any of the registered images, and hence the distributions make their transmissions as shown in FIGS. 9A to 9C. In this state, when face recognition processing is carried out in which the numbers of registered images are 1 and 10, levels of output values of integrated similarities are not coincident. Namely, the effect of integrated similarity for a person for which the number of registered images is 1 is small. Then, assuming that a person for which the number of registered images is 1 is an object of a check image, extra integrated similarity between a registered image for the check image and a person for which the number of registered images is 10 is comparable in value to intra integrated similarity with a registered image for the person in the check image. Therefore, comparison between the check image and the registered images makes no sense. For this reason, the integrated similarity calculation unit 104 dynamically determines the number of regions to be integrated according to the number of registered images as shown in FIG. 7 so as to make levels of output values of integrated similarities coincident. A description will be given below of how to determine the number of regions to be integrated according to the number of registered images.

The integrated similarity calculation unit 104 determines the number of regions to be integrated so that integrated similarities at intersections of the intra and extra distributions in FIGS. 9A to 9C can be substantially uniform in FIGS. 9A to 9C. To obtain the number of regions to be integrated so that integrated similarities can be substantially uniform, a plurality of different patterns in which the numbers of registered images are different are prepared, the number of similarity to be integrated is used as parameters, and substantially a uniform value of integrated similarity is used as an evaluation function. It should be noted that the way in which the number of regions to be integrated so that integrated similarities can be substantially uniform is not limited to this. The number of local features to be integrated dependent on the number of registered images eventually obtained is output to the parameter table shown in FIG. 7.

FIGS. 10A to 10C show exemplary distributions of integrated similarity after the number of regions to be integrated is adjusted. After the adjustment, extra and intra distributions are changed, and an intersection point of the two distributions is the same even when the numbers of registered images are different.

Referring again to FIG. 2, in the next step S204, the identification unit 106 carries out an identification process. First, the identification unit 106 calculates an image average similarity with respect to each registered person according to the following formula:

[Formula 12]

$$\underset{k_p}{\operatorname{average}}(IS_{k_p}) \quad (3)$$

Here, $$IS_{k_p} \quad \text{[Formula 13]}$$

is an integrated similarity for each image, and the formula (3) obtains an average value of integrated similarities for respective images with respect to the predetermined registered person p. Moreover, it can be said that the formula (3) obtains an integrated similarity with respect to each registered person. It should be noted that the formula (3) is not limited to calculation of an average value. For example, the maximum value of integrated similarity for the predetermined registered person p may be calculated using the formula (3). Next, the identification unit 106 determines which registered person is likely to be the person in the check image based on integrated similarities for the respective registered persons obtained using the formula (3). The identification unit 106 outputs a registered person with the highest integrated similarity as a result.

According to the present embodiment, when the number of registered images varies from registered person to registered person, this can be prevented from affecting face recognition accuracy.

It should be noted that the registration condition is not limited to the number of registered images, but may be the number of registered persons. When this condition is used, the integrated similarity calculation unit 104 changes the number of similarities to be integrated according to whether the number of registered persons is small or large.

A description will now be given of a second embodiment. The second embodiment differs from the first embodiment in the way in which a similarity set is calculated. A description will be given of a similarity set calculation method according to the present embodiment with reference to a conceptual diagram of FIG. 11 showing how to calculate a similarity set.

Figure 11:
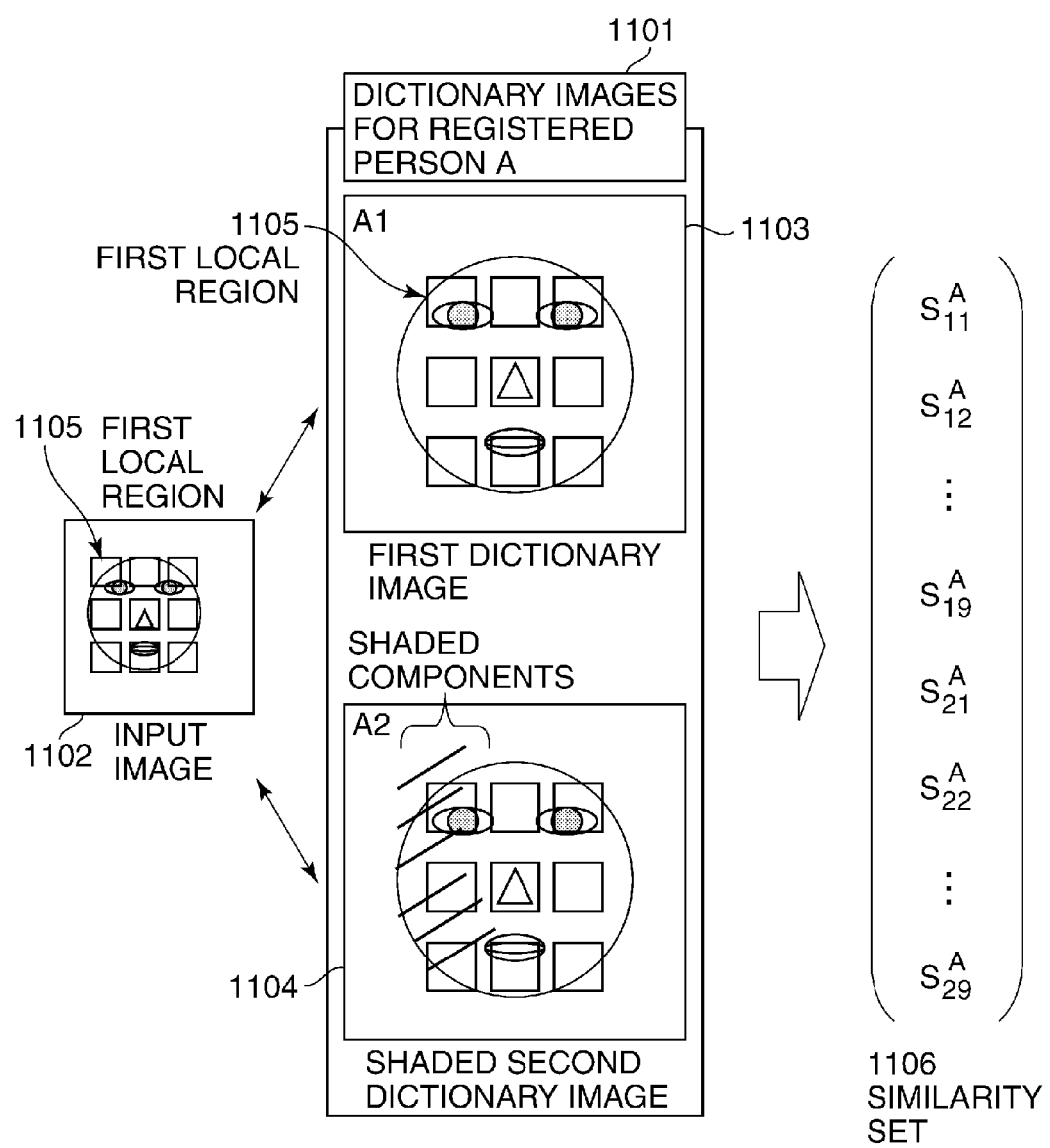
FIG. 11 is a diagram useful in explaining a similarity set calculation process according to a second embodiment.

FIG. 11 is a diagram useful in explaining the similarity set calculation method according to the present embodiment. Dictionary images 1101 for a registered person A are dictionary images relating to the registered person A, and in FIG. 11, there are two dictionary images as the dictionary images 1101. Although in FIG. 11, there is only one registered person A, there may be registered persons other than the registered person A. When there are registered persons other than the registered person A, the same process as the one shown in FIG. 11 is carried out on registered images for the registered persons other than the registered person A. As described earlier with reference to the flowchart of FIG. 5, the similarity calculation unit 103 calculates a similarity in local feature between a local region of an input image 1102 and the corresponding local region of a first dictionary image 1103. More specifically, the similarity calculation unit 103 calculates a similarity $$S_{11}^A \quad \text{[Formula 14]}$$

between luminance values of a first local region 1105 in FIG. 11 according to the formula (1). Then, the similarity calculation unit 103 calculates similarities between corresponding local regions from the first dictionary image 1103 and a shaded second dictionary image 1104, thus obtaining a similarity set 1106 in FIG. 11. Namely, the similarity set 1106 is a set of local feature similarities, which include all similarities in local regions with respect to the registered person A.

Next, a description will be given of a method to calculate an integrated similarity from the similarity set 1106 in FIG. 11. In the second embodiment, the integrated similarity calculation unit 104 obtains the integrated similarity using the following formula:

[Formula 15]

$$\text{Integrated similarity}(IS^p) = \frac{\sum_{k_p,i} w_{k_p i} S^p_{k_p i}}{\sum_{k_p,i} w_{k_p i}} \quad \text{where } w_{k_p i} = 0 \text{ or } 1 \quad (5)$$

Here, $$S^p_{k_p} \quad \text{[Formula 16]}$$

is each element of a similarity set for a certain registered person. More specifically, this is the same as the similarity set 1106 in FIG. 11. Moreover, $w_{k_p i}$ [Formula 17]

is a weight for each similarity. The similarity set 1106 is sorted, a weight of 1 is assigned to those included in a predetermined number of higher ranked similarities, and a weight of 0 is assigned to those not included in this group. Namely, this is a parameter that limits the number of similarities to be integrated described above in relation to the first embodiment. Thus, as is the case with the formula (2), the formula (4) is equivalent to obtaining one integrated similarity relating to the registered person p from a similarity set using a weighted average.

Next, a description will be given of a parameter that limits the number of similarities to be integrated. The parameter itself is determined according to the number of registered images as described above in relation to the first embodiment. The actual condition of the parameter and the way in which the parameter is obtained are the same as those in the first embodiment. Namely, the integrated similarity calculation unit 104 makes the horizontal axes of the distributions shown in FIGS. 9A to 9C correspond to the formula (4), and makes adjustments according to the number of registered images so that intersection points of intra distributions and extra distributions can be substantially uniform. Then, the integrated similarity calculation unit 104 creates a parameter table equivalent to the one shown in FIG. 7.

Next, a description will be given of how identification is carried out, that is, the process in step S204 in FIG. 2 according to the present embodiment. The identification unit 106 carries out identification using the following formula:
[Formula 17]

$$\operatorname*{argmax}_{p}(IS^p) \quad (5)$$

According to the formula (5), a person showing the maximum value of similarity relating to the registered person p represented by the formula (4) is regarded as a recognition result.

$IS^p$ [Formula 18]

is obtained according to the formula (4) by referring to the parameter table equivalent to the one shown in FIG. 7, and using an integrated similarity dependent on the number of registered images for a registered person. It should be noted that the identification unit 106 obtains a recognition result not only from the maximum value of integrated similarities, but also by extracting the maximum value of integrated similarities not less than a threshold value obtained by threshold processing on integrated similarities.

According to the present embodiment, the effect of the number of registered images can be reduced, and similarities in local regions can be obtained from a plurality of dictionary images including various changes. Namely, degradation of checking accuracy for a person having a number of images with variations registered.

A description will be given of a third embodiment. A basic flow in the present embodiment is substantially the same as that in the second embodiment, only features that are different from those of the first embodiment being described below.

Figure 12:
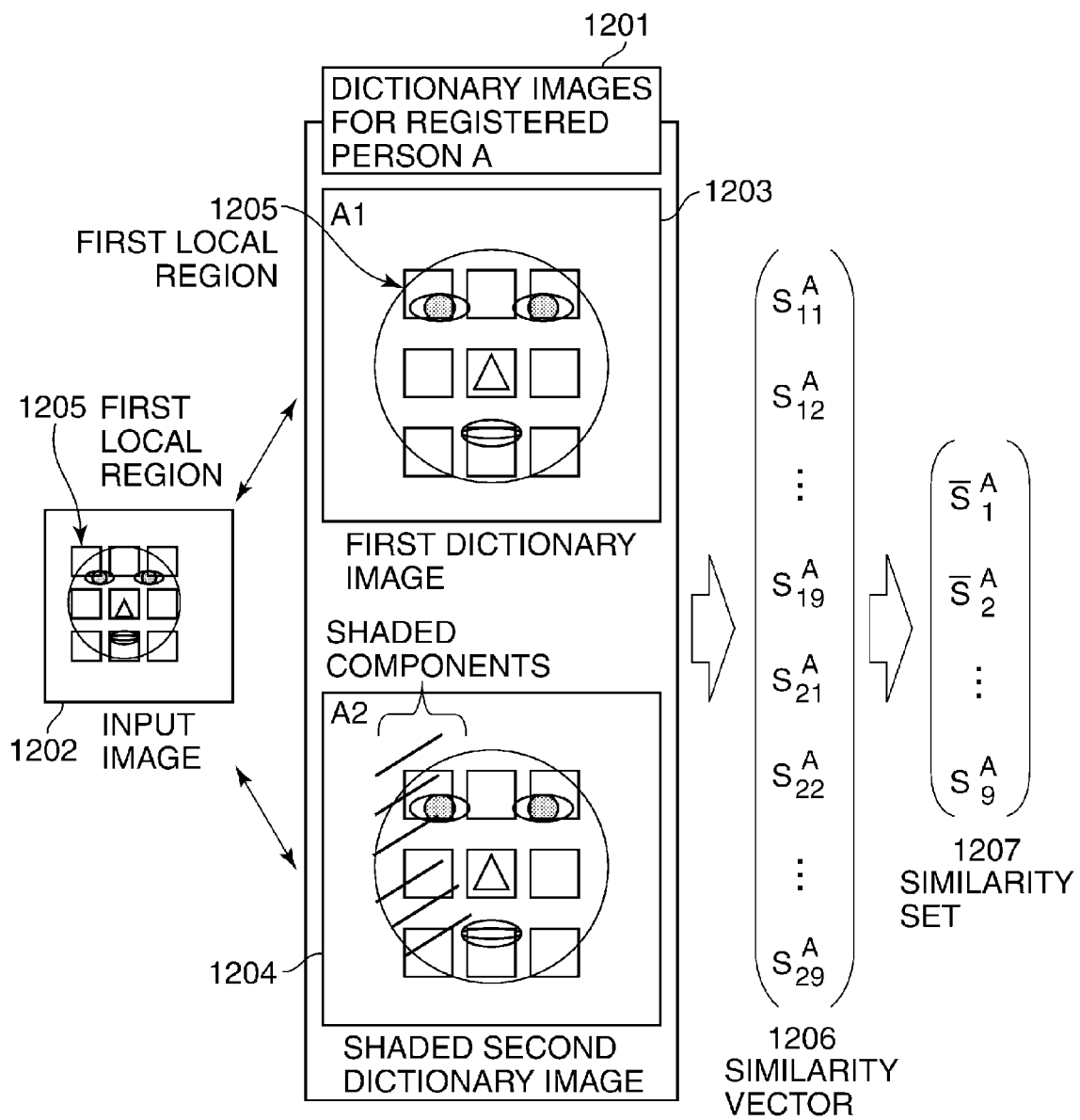
FIG. 12 is a diagram useful in explaining a similarity set calculation process according to a third embodiment.

The third embodiment differs from the second embodiment in the way in which a similarity set is calculated. A description will be given of a similarity set calculation method according to the present embodiment with reference to a conceptual diagram of FIG. 12 showing how to calculate a similarity set. FIG. 12 is a diagram useful in explaining the similarity set calculation method according to the present embodiment.

Dictionary images 1201 for a registered person A are dictionary images relating to the registered person A, and in FIG. 12, it is assumed that there are two dictionary images. Although in FIG. 12, there is only one registered person A, there may be registered persons other than the registered person A. When there are registered persons other than the registered person A, the same process as the one shown in FIG. 12 is carried out on registered images for the registered persons other than the registered person A. The dictionary images 1201 are comprised of a first dictionary image 1203 and a shaded second dictionary image 1204. The first dictionary image 1203 is an image with no variations in head pose, shading, and so on. On the other hand, the shaded second dictionary image 1203 is an image having shaded components indicated by oblique lines. An input image 1202 is an image with no variations in head pose, shading, and so on like the first dictionary image 1203. In this case, as described earlier with reference to FIG. 11, the similarity calculation unit 103 calculates a correlation value between features amounts in corresponding local regions of the input image 1202 and the first dictionary image 1203, and a correlation value between features amounts in corresponding local regions of the input image 1202 and the shaded second dictionary image 1204. Calculated similarities are as represented by similarity vectors 1206. Based on the similarity vectors 1206, the integrated similarity calculation unit 104 obtains a similarity set 1207 which is a set of similarities in respective local regions. The similarities in the respective local regions are each comprised of, for example, an average value of a similarity in the first local region of the first dictionary image 1203 dictionary image $S_{11}{}^A$ [Formula 19]

and a similarity in the first local region of the shaded second dictionary image 1204

$S_{21}{}^A$ [Formula 20]

A general expression is as follows:

[Formula 21]

$$\bar{S}_i^p = \frac{\sum_{k_p} S_{k_p i}^p}{\sum k_p} \quad (6)$$

Here, $\bar{S}_i^p$ [Formula 22]

is an average value of similarities in the ith local region for the registered person p, that is, an average value of similarities with respect to each piece of positional information.

$S_{k_p i}^p$ [Formula 23]

expresses a similarity in the ith local region of the Kpth dictionary image for the registered person p. The formula (6) expresses a process to combine similarities in local regions set at the same position into one.

Next, a description will be given of a method to calculate integrated similarity from the similarity set 1207 in FIG. 12. In the present embodiment, the integrated similarity calculation unit 104 obtains integrated similarity using the following formula:

[Formula 24]

$$\text{Integrated similarity}(IS^p) = \frac{\sum_i w_i \overline{S}_i^p}{\sum_i w_i} \text{ where } w_i = 0 \text{ or } 1 \quad (7)$$

Here, $$\overline{S}_i^p \quad \text{[Formula 25]}$$

is each element of the similarity set 1207 for a certain registered person in FIG. 11, and more specifically, the same one as the similarity set 1106 in FIG. 11

$$w_i \quad \text{[Formula 26]}$$

is a weight for each similarity. The similarity set 1206 is sorted, a weight of 1 is assigned to those included in a predetermined number of upper-ranked similarities, and a weight of 0 is assigned to those not included in this group. Namely, this is a parameter that limits the number of similarities to be integrated described above in relation to the first embodiment. Thus, as is the case with the formula (2), the formula (7) is equivalent to obtaining one integrated similarity relating to the registered person p from a similarity set using a weighted average.

Next, a description will be given of a parameter that limits the number of similarities to be integrated. The parameter itself is determined according to the number of registered images as described above in relation to the first embodiment. The actual condition of the parameter and the way in which the parameter is obtained are the same as those in the first embodiment. Namely, the integrated similarity calculation unit 104 makes the horizontal axes of the distributions shown in FIGS. 9A to 9C correspond to the formula (7), and makes adjustments according to the number of registered images so that intersection points of intra distributions and extra distributions can be substantially uniform. Then, the integrated similarity calculation unit 104 creates a parameter table equivalent to the one shown in FIG. 7.

Next, a description will be given of how identification is carried out, that is, the process in the step S204 in FIG. 2. The identification process in the step S204 in the third embodiment is the same as the formula (5) in the second embodiment. Therefore, a formula itself which expresses the identification process is omitted here. According to the formula (5) in the present embodiment, a person having the maximum value of integrated similarities relating to the registered person p expressed by the formula (7) is regarded as a recognition result. In this case, the identification unit 106 obtains integrated similarity for each registered person using the formula (7) by referring to a parameter table corresponding to the one shown in FIG. 7, and using the number of similarities to be integrated dependent on the number of registered images for the registered person. It should be noted that the identification unit 106 obtains a recognition result not only from the maximum value of integrated similarities, but also by extracting the maximum value of integrated similarities not less than a threshold value obtained by threshold processing on integrated similarities.

According to the present embodiment, the effects of variations in the number of registered images can be reduced, and similarities of respective local regions can be obtained from a plurality of dictionary images having variations. Namely, degradation of face recognition accuracy for a person for which there is a large number of registered images having variations can be prevented.

Although in the first, second, and third embodiments, variations in the number of registered images are dealt with, the present invention is not limited to this. The present invention can also deal with differences in registration conditions other than the number of registered images, such as differences in the number of registered persons, or differences in the characteristics of an image pickup device for taking images, face size, lighting environment, head pose, hiding of facial organs, changes in facial expression, face detection reliability, and local feature reliability of a check image with respect to each registered image.

Moreover, the present invention can deal with differences in time elapsed after shooting of dictionary data at the time of checking, which is a check condition, or differences in face size, lighting environment, head pose, hiding of facial organs, changes in facial expression, face detection reliability, and local feature reliability of a check image with respect to registered image.

In a fourth embodiment, as an example, it is assumed that there is a difference in head pose, more specifically, when there is a differences in head pose between dictionary data and input data. A head pose parameter table shown in FIG. 13 is used for head pose. The table of FIG. 13 shows the number of similarities to be integrated in cases where head poses of the dictionary data and the input data are front, left 30°, right 30°, up 30°, and down 30°. It should be not that the angle of head pose is not limited to 30°, but may be 15°. Moreover, the directions of head pose are limited to right, left, up, and down, but right/left head poses and up/down head poses may be mixed. Moreover, regarding definitions of left and right, left means a left-hand direction as one faces an image, and right means a right-hand direction as one faces an image. In the head pose parameter table, the number of similarities to be integrated is top 70 when head poses in dictionary data and input data are the same. It should be noted that the maximum number of similarities to be integrated is 100. When a difference in head pose is about 30°, for example, when head pose in dictionary data is frontal and head pose in input data is left 30°, the number of similarities to be integrated is top 60. Also, when a difference in head pose is about 60°, for example, when head pose in dictionary data is left 30°, and head pose in input data is right 30°, the number of similarities to be integrated is top 50.

As described above, the integrated similarity calculation unit 104 dynamically determines the number of similarities to be integrated according to a difference in head pose between dictionary data and input data. This is because there is a difference in the distribution of integrated similarities, as shown in FIGS. 9A to 9C, between a case where there is no difference in head pose and a case where there is a difference in head pose. However, this is a difference on condition that the number of similarities to be integrated is the same. Namely, even for the same person, the difficulty of checking varies according to differences in head pose. Thus, a mechanism for dynamically determining the number of similarities to be integrated according to head pose is required so as to make the difficulty of checking substantially uniform even when there is a difference in head pose as shown in the distributions in FIGS. 9A to 9C. Next, a description will be given of how to obtain the head pose parameter table 1301.

Figure 14A:
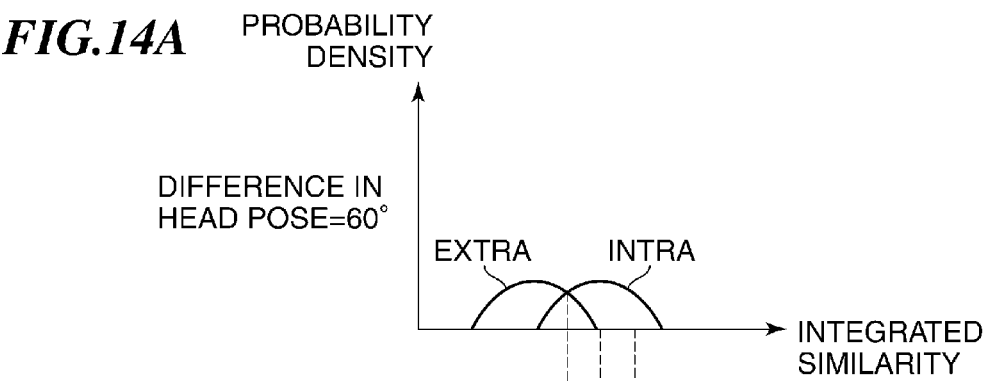
FIGS. 14A to 14C are diagrams showing changes in intra distribution and extra distribution in accordance with head pose.
Figure 14B:
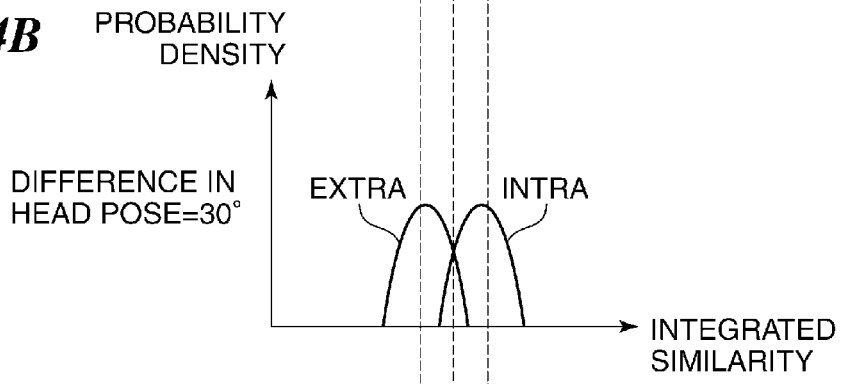
Figure 14C:
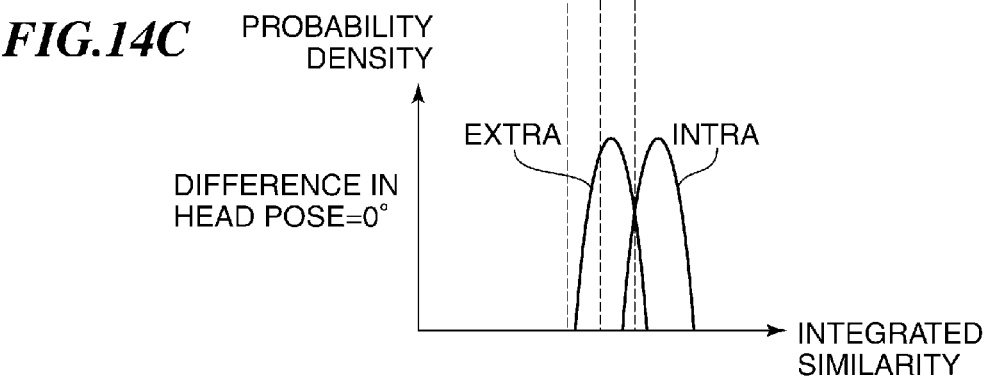

The way in which the head pose parameter table 1301 is obtained is not much different from the first embodiment. In the present embodiment as well, the integrated similarity calculation unit 104 obtains the head pose parameter table 1301 by creating distributions equivalent to those in FIGS. 9A to 9C, and making adjustments so that intersection points of intra distributions and extra distributions can be substantially uniform even when head pose changes. FIGS. 14A to 14C show changes in intra distribution and extra distribution due to changes in head pose. Integrated similarity distributions 1401 in FIGS. 14A to 14C show changes in integrated similarity distribution when differences in head pose between dictionary data and input data is 0°, 30°, and 60°. It should be noted that differences in head pose are not limited to those in FIGS. 14A to 14C, but there may be other differences in pose such as 10° and 75°. To obtain the parameters in FIG. 13, the integrated similarity calculation unit 104 makes intersection points of the intra distributions and the extra distributions in FIGS. 14A to 14C substantially uniform. The way in which intersection points of the intra distributions and the extra distributions are made substantially uniform is the same as in the first embodiment described above. Next, a description will be given of how to obtain integrated similarity.

As in the first embodiment, the integrated similarity calculation unit 104 calculates integrated similarity using the formula (2) and the parameter table in FIG. 13. As distinct from the first embodiment, it is necessary to determine attributes such as head pose with respect to both input data and dictionary data so as to measure a difference in head pose. To estimate head pose, a well-known technique can be used. For example, a technique described in "Head Pose Estimation in Computer Vision: A survey", IEEE Transactions on Pattern Analysis and Machine Intelligence, pp. 607-626, Vol. 31, No. 4, April 2009 can be used. Head pose in dictionary data is extracted using a predetermined technique when dictionary data itself is obtained. On the other hand, head pose in input data is obtained before the step S203 in the flowchart of FIG. 2 is executed. It should be noted that the actual identification process is the same as the identification process step S204 in the first embodiment, and therefore, description thereof is omitted.

In the above description, the detailed description of the embodiment have been given using head pose as an example. In the present embodiment, the present invention is not limited to head pose. A brief description will be given of adjustment methods for items relating to a registration condition and a check condition other than head pose.

Next, a description will be given of a face size condition. In the case of this condition, the integrated similarity calculation unit 104 dynamically determines the number of similarities to be integrated according to a difference in face size obtained when faces in dictionary data and input data are detected.

Next, a description will be given of a lighting environment condition. In the case of this condition, the integrated similarity calculation unit 104 dynamically determines the number of similarities to be integrated according to a difference in lighting environment between dictionary data and input data.

Next, a description will be given of a face organ hiding condition. In the case of this condition, the integrated similarity calculation unit 104 dynamically determines the number of similarities to be integrated according to degrees to which an organ such as an eye is hidden by hair and the like in dictionary data and input data.

Next, a description will be given of a facial expression change condition. In the case of this condition, the integrated similarity calculation unit 104 dynamically determines the number of similarities to be integrated according to a difference in facial expression between dictionary data and input data.

Next, a description will be given of a face detection reliability condition. In the case of this condition, the integrated similarity calculation unit 104 dynamically determines the number of similarities to be integrated according to a difference in the degree to which face likeness is gauged in face detection processing between dictionary data and input data.

Next, a description will be given of a local feature reliability condition. In the case of this condition, the integrated similarity calculation unit 104 dynamically determines a difference in the feature reliability of local features between dictionary data and input data.

Next, a description will be given of an image pickup device characteristic condition. In the case of this condition, the integrated similarity calculation unit 104 dynamically determines the number of similarities to be integrated according to a difference in the characteristic of an image pickup device between dictionary data and input data. Here, the characteristic of an image pickup device means white balance, ISO sensitivity, or the like.

Next, a description will be given of an elapsed time condition after shooting of dictionary data. In the case of this condition, the integrated similarity calculation unit 104 dynamically determines the number of similarities to be integrated according to a time elapsed as of checking since dictionary data is taken.

According to the fourth embodiment, degradation of face recognition accuracy due to a difference in a registration condition or check condition can be prevented.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-078984 filed Mar. 30, 2010, which is hereby incorporated by reference herein in its entirety.

What is claimed is:

1. A pattern recognition apparatus comprising:
   a similarity set generation unit configured to generate respective similarity sets for a plurality of objects by calculating a similarity of a local feature of each local area in input image data and a local feature of a corresponding local area in each image registered in a dictionary and collecting calculated similarities with respect to each object as a similarity set, where one or more images have been registered for each object in the dictionary;
   a determination unit configured to determine a first number of higher-ranked similarities to be integrated for each object based on a second number of registered images for that object in the dictionary in accordance with a predetermined relationship between the first number and the second number, where the greater the second number is, the greater the first number is;
   an integrated similarity calculation unit configured to calculate an integrated similarity for each object by sorting a plurality of similarities in the similarity set for that object and integrating the first number of higher-ranked similarities in the similarity sets for that object; and an identification unit configured to identify an object corresponding to the input image data based on the integrated similarity for each object calculated by said integrated similarity calculation unit.

2. A pattern recognition apparatus according to claim 1, wherein said integrated similarity calculation unit calculates the integrated similarities from a weighted average value of the similarity sets for respective local features calculated by said similarity set calculation unit for each position to which weights are assigned according to the second number of registered images.

3. A pattern recognition apparatus according to claim 1, wherein said similarity set calculation unit calculates the similarity sets by combining, with respect to each local region, similarities between a feature amount in a local region of the input data and a feature amount in a local region corresponding to the local region of the input data in each of the plurality of pieces of dictionary data.

4. A pattern recognition apparatus according to claim 1, wherein said integrated similarity calculation unit calculates the integrated similarities by integrating similarities corresponding in number to a difference in attribute between the input data and the dictionary data from a top-ranked similarity in the similarity sets in the local features calculated by said similarity set calculation unit.

5. A pattern recognition apparatus according to claim 1, wherein the input data or the dictionary data is a human image or a face image.

6. A pattern recognition method implemented by a pattern recognition apparatus, comprising:

a similarity set generation step of generating respective similarity sets for a plurality of objects by calculating a similarity of a local feature of each local area in input image data and a local feature of a corresponding local area in each image registered in a dictionary and collecting calculated similarities with respect to each object as a similarity set, where one or more images have been registered for each object in the dictionary;

a determination step of determining a first number of higher-ranked similarities to be integrated for each object based on a second number of registered images for that object in the dictionary in accordance with a predetermined relationship between the first number and the second number, where the greater the second number is, the greater the first number of higher-ranked similarities to be integrated for that object is;

an integrated similarity calculation step of calculating an integrated similarity for each object by sorting a plurality of similarities in the similarity set for that object and integrating the determined number of top-ranked similarities in the similarity sets for that object; and an identification step of identifying an object corresponding to the input image data based on the integrated similarity for each object calculated in said integrated similarity calculation step.

7. A non-transitory storage medium storing a computer-readable program for causing a pattern recognition apparatus to implement a pattern recognition method, the method comprising:

a similarity set generation step of generating respective similarity sets for a plurality of objects by calculating a similarity of a local feature of each local area in input image data and a local feature of a corresponding local area in each image registered in a dictionary and collecting calculated similarities with respect to each object as a similarity set, where one or more images have been registered for each object in the dictionary;

a determination step of determining a first number of higher-ranked similarities to be integrated for each object based on a second number of registered images for that object in the dictionary in accordance with a predetermined relationship between the first number and the second number, where the greater the second number is, the greater the first number of higher-ranked similarities to be integrated for that object is;

an integrated similarity calculation step of calculating an integrated similarity for each object by sorting a plurality of similarities in the similarity set for that object and integrating the determined number of top-ranked similarities in the similarity sets for that object; and an identification step of identifying an object corresponding to the input image data based on the integrated similarity for each object calculated in said integrated similarity calculation step.

8. A pattern recognition apparatus according to claim 1, wherein said determination unit determines the first number by referring to a correspondence table in which respective first numbers are prescribed for a plurality of second numbers in accordance with the predetermined relationship.

* * * * *